(12) United States Patent
Li et al.

(10) Patent No.: US 11,834,195 B2
(45) Date of Patent: Dec. 5, 2023

(54) APPARATUS, SYSTEMS, AND METHODS FOR MANAGING COMMON MODE PNEUMATIC EVENTS

(71) Applicant: The Boeing Company, Chicago, IL (US)

(72) Inventors: Sherwin Chunshek Li, Edmonds, WA (US); Leonard John Inderhees, Bothell, WA (US); Russell T. Bridgewater, Monroe, WA (US); Robert Erik Freeman, Seattle, WA (US); Rostyslav Oleksiy Svitelskyi, Lynnwood, WA (US); William Tyler Piersol, Everett, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/578,100

(22) Filed: Jan. 18, 2022

(65) Prior Publication Data
US 2022/0258877 A1 Aug. 18, 2022

Related U.S. Application Data

(60) Provisional application No. 63/150,922, filed on Feb. 18, 2021.

(51) Int. Cl.
*B64D 43/02* (2006.01)
*G01P 13/02* (2006.01)
*B64C 13/50* (2006.01)

(52) U.S. Cl.
CPC ........... *B64D 43/02* (2013.01); *B64C 13/503* (2013.01); *G01P 13/025* (2013.01)

(58) Field of Classification Search
None
See application file for complete search history.

(56) References Cited

U.S. PATENT DOCUMENTS

| 6,414,282 B1 * | 7/2002 | Ice ..................... G05D 23/1913 |
| | | 219/508 |
| 9,731,814 B2 * | 8/2017 | McIntyre .................. G01P 5/16 |
| 10,006,928 B1 * | 6/2018 | Hagerott ................... G01P 5/16 |

(Continued)

OTHER PUBLICATIONS

European Patent Office, "Extended European Search Report," issued in connection with European Patent Application No. 22151733.7, dated Jun. 21, 2022, 8 pages.

*Primary Examiner* — Peter J Macchiarolo
*Assistant Examiner* — Jermaine L Jenkins
(74) *Attorney, Agent, or Firm* — HANLEY, FLIGHT & ZIMMERMAN, LLC

(57) ABSTRACT

An example system includes a common mode pneumatic event detector to detect a common mode pneumatic event at pitot tubes of an aircraft, a latch, a relay switch in communication with the latch, and a latch controller to set the latch in a first state to cause the latch to output a first latch signal, the relay switch to output a first pressure signal in response to the first latch signal, the first pressure signal based on pressure data from the pitot tubes, and set the latch in a second state to cause the latch to output a second latch signal based on the detection of the common mode pneumatic event. The relay switch is to output a second pressure signal in response to the second latch signal. The second pressure signal includes estimated pressure data.

20 Claims, 6 Drawing Sheets

(56) References Cited

U.S. PATENT DOCUMENTS

| | | |
|---|---|---|
| 10,605,822 B2 * | 3/2020 | Luo ..................... G01P 21/025 |
| 10,768,201 B2 | 9/2020 | Luo et al. |
| 11,029,706 B2 * | 6/2021 | Li ....................... G05D 1/0808 |
| 11,035,877 B2 * | 6/2021 | Oltheten ................ G01P 5/165 |
| 11,066,189 B2 | 7/2021 | Li et al. |
| 2010/0100260 A1 | 4/2010 | Mcintyre et al. |
| 2018/0356439 A1 | 12/2018 | Luo et al. |
| 2020/0180789 A1 | 6/2020 | Li et al. |
| 2020/0183423 A1 | 6/2020 | Li et al. |
| 2020/0309810 A1 | 10/2020 | Carvalho et al. |

* cited by examiner

APPARATUS, SYSTEMS, AND METHODS FOR MANAGING COMMON MODE PNEUMATIC EVENTS

RELATED APPLICATION

This patent claims the benefit of U.S. Provisional Patent Application No. 63/150,922, which was filed on Feb. 18, 2021. U.S. Provisional Patent Application No. 63/150,922 is hereby incorporated herein by reference in its entirety. Priority to U.S. Provisional Patent Application No. 63/150,922 is hereby claimed.

FIELD OF THE DISCLOSURE

This disclosure relates generally to flight control systems, and, more particularly, to apparatus, systems and methods for managing common mode pneumatic events.

BACKGROUND

An aircraft includes pitot tubes (also known in some instances as pitot probes) that output pressure sensor data during flight. Data from the pitot tubes is used to determine metrics for the aircraft such as speed.

SUMMARY

An example system includes a common mode pneumatic event detector to detect a common mode pneumatic event at pitot tubes of an aircraft, a latch, a relay switch in communication with the latch, and a latch controller to set the latch in a first state to cause the latch to output a first latch signal, the relay switch to output a first pressure signal in response to the first latch signal, the first pressure signal based on pressure data from the pitot tubes, and set the latch in a second state to cause the latch to output a second latch signal based on the detection of the common mode pneumatic event. The relay switch is to output a second pressure signal in response to the second latch signal. The second pressure signal includes estimated pressure data.

An example method includes causing a relay switch to output a first pressure signal, the first pressure signal indicative of a pressure measured at one or more pitot tubes of an aircraft, detecting a common mode pneumatic event at the pitot tubes of the aircraft based on the pressure measured at the one or more pitot tubes, and causing the relay switch from outputting the first pressure signal to outputting a second pressure signal in response to the detection of the common mode pneumatic event. The second pressure signal is indicative of an estimated pressure. The second pressure signal is to be used to determine one or more airspeed parameters of the aircraft.

Another example system an air data reference function controller to generate a pitot tube pressure signal based on pressure signals output by pitot tubes of an aircraft, the air data reference function controller including a relay, a synthetic signal pressure signal generator to generate an estimated pressure signal, a calculator, and a common mode pneumatic event detector in communication with the relay. The common mode pneumatic event detector is to generate a first instruction to cause the air data reference function controller to output the pitot tube pressure signal to the calculator, detect a common mode pneumatic event at the pitot tubes, and generate a second instruction to cause the air data reference function controller to output the estimated pressure signal to the calculator in response to the detection of the common mode pneumatic event. The estimated pressure signal is to replace pitot tube pressure signal. The calculator is to determine an airspeed of the aircraft based on the one of (a) the pitot tube pressure signal or (b) the estimated pressure signal.

An example non-transitory computer readable medium includes instructions that, when executed by at least one processor, cause the at least one processor to cause a relay switch to output a first pressure signal, the first pressure signal indicative of a pressure measured at one or more pitot tubes of an aircraft, detect a common mode pneumatic event at the pitot tubes of the aircraft based on the pressure measured at the one or more pitot tubes, and cause the relay switch from outputting the first pressure signal to outputting a second pressure signal in response to the detection of the common mode pneumatic event. The second pressure signal is indicative of an estimated pressure. The second pressure signal is to be used to determine one or more airspeed parameters of the aircraft.

BRIEF DESCRIPTION OF THE DRAWINGS

The figures are not to scale. Instead, the thickness of the layers or regions may be enlarged in the drawings. In general, the same reference numbers will be used throughout the drawing(s) and accompanying written description to refer to the same or like parts.

Figure 1:
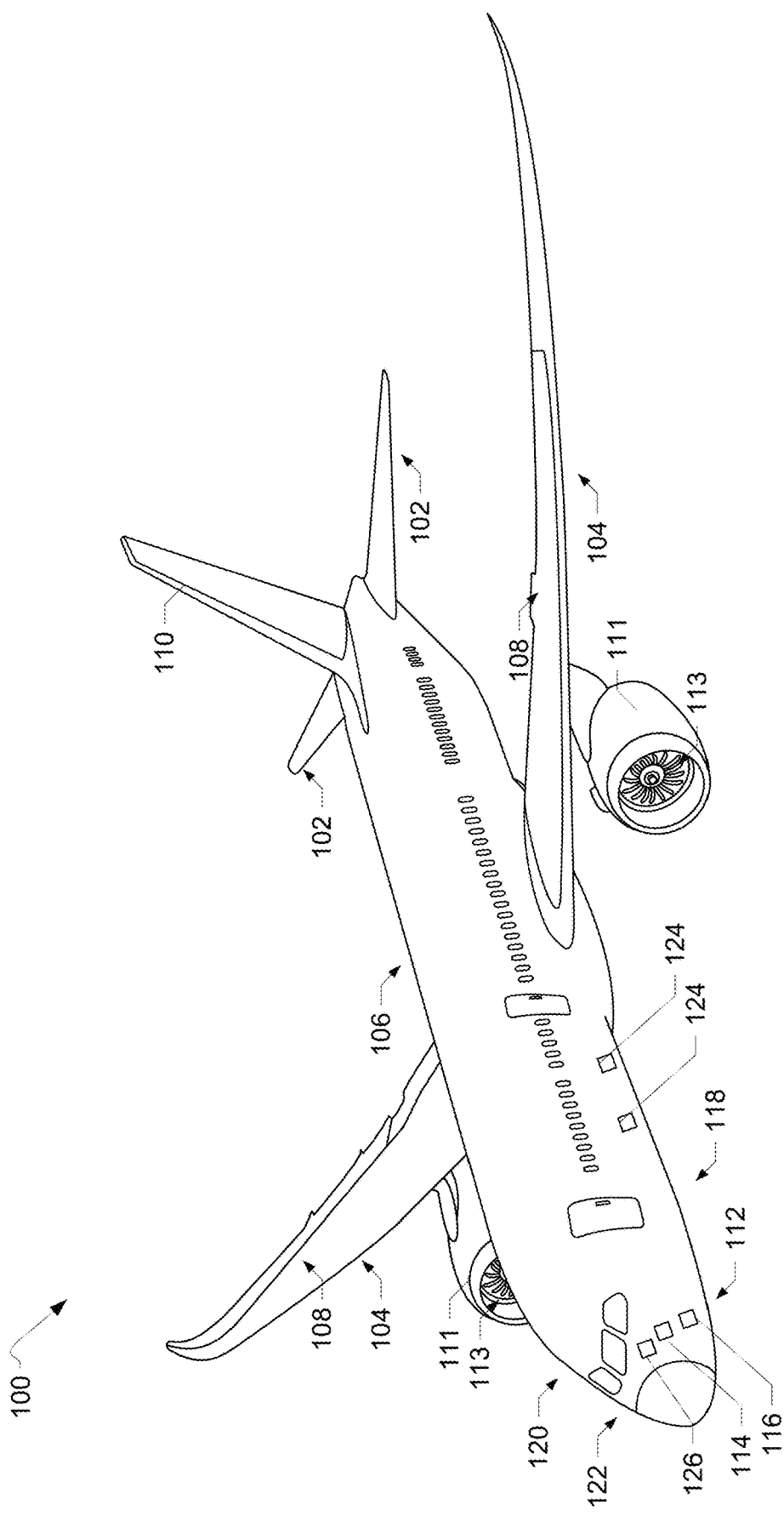
FIG. 1 illustrates an example air vehicle in which examples disclosed herein may be implemented.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

An aircraft includes pitot tubes that output pressure data during flight. Data from the pitot tubes is used to determine metrics for the aircraft such as speed. The pressure readings from the individual pitot tubes can be averaged or used to select a midpoint value from the individual signals to obtain a total pressure measurement. The total pressure measurement is used to determine aircraft speed.

During flight, the pitot tubes can become blocked due to ice, debris (e.g., volcanic ash), insects, bird strikes, etc. A common mode pneumatic event occurs when a majority of the pitot tubes are blocked or otherwise not operating correctly at substantially the same time (e.g., within a time frame of milliseconds to seconds). As a result of the blocked pitot tubes, the total pressure measurement and, thus, the airspeed values calculated therefrom, are inaccurate. For instance, when the total pressure measurement is low due to blocked pitot tubes, the calculated airspeed can indicate that the aircraft is rapidly losing speed or stalling. In response to such erroneous data, a pilot may respond with overaggressive maneuvers of the aircraft, such as a pushover maneuver.

In some instances, common mode pneumatic events at the pitot tubes are resolved over time. For instance, icing events at the pitot tubes can be resolved via heat, which enables the pitot tube pressure readings and the aircraft speeds calculated therefrom to return to accurate values. To prevent unwarranted alerts to the pilot that could prompt the pilot to take unnecessary actions while blockage events at the pitot tubes are being resolved, a synthetic or estimated pressure signal can be used instead of the pressure signals from the pitot tubes, as disclosed in U.S. patent application Ser. No. 15/620,224 and U.S. patent application Ser. No. 16/213,406. U.S. patent application Ser. No. 15/620,224 and U.S. patent application Ser. No. 16/213,406 are incorporated herein by reference in their entireties. The synthetic pressure data can be used instead of the pressure data measured at the pitot tubes to determine airspeeds until the pitot tube readings return to normal.

For instance, in response to detection of a common mode pneumatic event by a common mode monitor of an aircraft, a flight control system of the aircraft can operate in an extended normal mode for a predefined period of time in which (e.g., a time delay during which) estimated pressure values in the synthetic signal are used to calculate airspeeds instead of the measured pressure values from the pitot tubes. Thus, the pilot does not detect a significant change in airspeed data. Rather, the common mode pneumatic event is suppressed for a period of time by use of the synthetic signal data. During this period of time, systems of the aircraft such as the flight control system, an autopilot control system, and an autothrottle control system operate using metrics generated based on the estimated pressures. However, if the common mode pneumatic event continues to be detected after the time delay, the actual pitot tube pressure data is used to calculate airspeeds, which can alert the pilot to ongoing or recurring blockage events at the pitot tubes.

Disclosed herein are example systems and methods that provide a flight control system architecture to manage common mode pneumatic events. Examples disclosed herein include a common mode pneumatic event (CMPE) detector to identify common mode pneumatic events at pitot tubes (also known in some instances as pitot probes) of an air vehicle and to dynamically respond to the occurrence of such events (i.e., ice blockage) as well as the resolution of such events (e.g., melting of the ice). In examples disclosed herein, the CMPE detector controls a latch to cause output of one of (a) signal data including total pressure measured by the pitot tubes or (b) synthetic signal data including estimated total pressure. Examples disclosed herein implement multiple criteria for determining if the synthetic signal should be output instead of the total pressure measured by the signal data generated at the pitot tubes.

In examples disclosed herein, metrics or parameters such as airspeeds of the aircraft are determined using the selected signal data (e.g., the actual total pressures measured at the pitot tubes or the estimated total pressures of the synthetic signal). Examples disclosed herein limit a number of times that the latch is set to cause the synthetic signal to be output. This limit accounts for recovery of the blockage events at the pitot tubes and promotes a return to the use of the actual measured data provided by the pitot tubes. The limit on the number of times the latch can be set to output the synthetic signal also prevents a flight control system from failing to alert a pilot of ongoing or recurring problems at the pitot tubes that require attention. In examples disclosed herein, the CMPE detector augments the detection of common mode pneumatic events at the pitot tubes by a common mode monitor of the aircraft by dynamically responding to the occurrence of or the resolution of the common mode pneumatic events and corresponding use of the synthetic pressure signal.

FIG. 1 illustrates an example aircraft 100 in which the examples disclosed herein may be implemented. In the illustrated example, the aircraft 100 includes stabilizers 102 and wings 104 coupled to a fuselage 106. The wings 104 of the aircraft 100 have control surfaces 108 located along the leading and/or trailing edges of the wings 104. The control surfaces 108 may be displaced or adjusted (e.g., angled, etc.) to provide lift during takeoff, landing and/or flight maneuvers. The control surfaces 108 include, for instance, leading edge flaps, leading edge slats, upper spoilers (e.g., flight spoilers, ground spoilers, upper surface spoilers, etc.), and trailing edge flaps (e.g., rotatable flaps). In this example, the stabilizers 102 include a rudder 110.

The aircraft 100 includes a nacelle 111 coupled to each wing 104. Each nacelle 111 houses an engine 113.

The example aircraft 100 of FIG. 1 includes a plurality of sensors to collect data during flight of the aircraft 100. In the example of FIG. 1, the aircraft 100 includes a plurality of pitot tubes 112 including a first pitot tube 114 and a second pitot tube 116 on a first side 118 of the fuselage 106 and a third pitot tube (not shown) on a second side 120 of the aircraft 100. In the example of FIG. 1, the pitot tubes 112 are disposed at a nose 122 of the aircraft 100. However, the pitot tubes 112 can be located at other locations on the aircraft 100. The aircraft 100 can include additional or fewer pitot tubes than shown in FIG. 1.

The aircraft 100 includes static ports 124 located on each side 118, 120 of the aircraft 100 between the pitot tubes 112 and the wings 104. The aircraft 100 can include additional static ports 124 than shown in FIG. 1

The example aircraft 100 of FIG. 1 includes angle of attack sensors 126. Although only one angle of attack sensor 126 is shown in FIG. 1, the aircraft 100 can include additional angle of attack sensors 126 (e.g., additional sensors located on the second side 120 of the fuselage 106).

The example aircraft 100 includes engine pressure and/or fan speed sensors (not shown) disposed at the engines 113. Also, the aircraft 100 can include additional sensors such as temperature sensors (e.g., engine air temperature probes) and inertial data sensors (e.g., accelerometers, gyroscopes), and/or sensors to measure deflection of the control surface(s) 108 of the aircraft 100.

Figure 2:
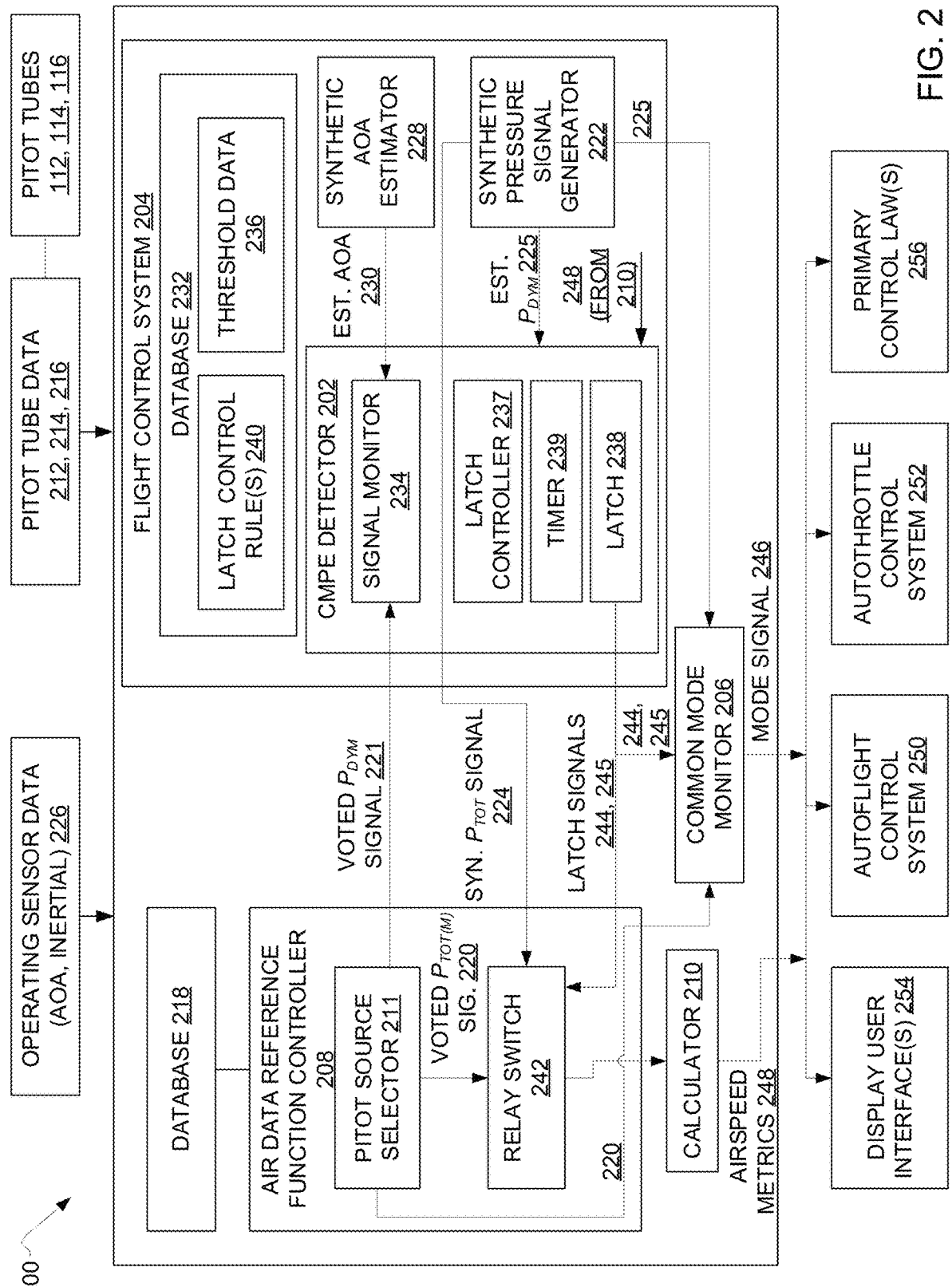
FIG. 2 is block diagram of an example common mode pneumatic event control system including an example implementation of a common mode pneumatic event detector for detecting a common mode pneumatic event at pitot tubes of the example air vehicle of FIG. 1.

FIG. 2 is a block diagram of an example common mode pneumatic event (CMPE) control system 200 for detecting common mode pneumatic events, or blockages of pitot tubes of an aircraft (e.g., blockages at a majority of the pitot tubes). The example CMPE control system 200 of FIG. 2 can be implemented at the example aircraft 100 of FIG. 1 to address common mode pneumatic events at the pitot tubes 112 of the aircraft 100.

The example CMPE control system 200 of FIG. 2 includes a CMPE detector 202 that is implemented by a flight control system 204 of the aircraft 100 of FIG. 1. The flight control system 204 is implemented by one or more processors (e.g., flight control computers). The example CMPE control system 200 of FIG. 2 includes a common mode monitor 206, an air data reference function (ADRF) controller 208, and a calculator 210. The common mode monitor 206, the ADRF controller 208, and the calculator 210 can be implemented by avionics (e.g., processor(s), electronics) of the aircraft 100.

The example ADRF controller 208 includes a pitot source selector 211. The pitot source selector 211 of FIG. 2 receives signal data representative of pressures detected at the respective pitot tubes 112 of the aircraft 100 of FIG. 1. For instance, the pitot source selector 211 receives first pressure signal data 212 from a first pitot tube of the aircraft 100 of FIG. 1 (e.g., the first pitot tube 114), second pressure signal data 214 from a second pitot tube of the aircraft 100 (e.g., the second pitot tube 116), and third pressure signal data 216 from a third pitot tube of the aircraft 100. The pitot tube pressure data 212, 214, 216 can be stored in a database 218. In some examples, the pitot source selector 211 includes the database 218. In other examples, the database 218 is located external to the pitot source selector 211 in a location accessible to the pitot source selector 211, as shown in FIG. 2.

The pitot source selector 211 analyzes the signal data 212, 214, 216 from the pitot tubes 112 to generate a voted pitot tube signal 220. The voted pitot tube signal 220 represents measured total pressure $P_{tot(m)}$ calculated from the pitot tube signal data 212, 214, 216. In some examples, the pitot source selector 211 averages the pressure values associated with the signal data 212, 214, 216 to generate the total pressure value $P_{tot(m)}$. In other examples, the pitot source selector 211 selects one of the pitot tube signals 212, 214, 216 to represent the total pressure value $P_{tot(m)}$ based on, for instance, a mid-value select approach.

In the example of FIG. 2, the ADRF controller 208 calculates a measured dynamic pressure $Q_{bar(m)}$ based on the total pressure value $P_{tot(m)}$ from the pitot tubes 112 and a static pressure $P_s$ measured at the static ports 124 of the aircraft 100. The measured dynamic pressure can be a voted signal based on at least one of the signals 212, 214, 216 from the pitot tubes 112. The ADRF controller 208 outputs a voted dynamic pressure signal 221 (e.g., raw dynamic pressure data) for access by the CMPE detector 202.

The example CMPE control system 200 of FIG. 2 includes a synthetic pressure signal generator 222. The synthetic pressure signal generator 222 can be implemented by the flight control system 204. In the example of FIG. 2, the synthetic pressure signal generator 222 generates a synthetic total pressure signal 224 and an estimated dynamic pressure signal, or synthetic dynamic pressure signal 225. In the example of FIG. 2, the synthetic pressure signal generator 222 generates the synthetic dynamic pressure signal 225 using the operating parameter data 226 and a lift coefficient and/or a draft coefficient of the aircraft 100, as disclosed in U.S. patent application Ser. No. 16/213,406 and U.S. patent application Ser. No. 15/620,224, which are incorporated herein by reference in their entireties. The operating parameter data 226 can include data from sensors such as the angle of attack sensors 126, inertial data sensors, engine fan speed or engine pressure ratio, and/or control surface sensors of the aircraft 100 (e.g., sensors to measure deflection of the control surfaces). In examples disclosed herein, the estimated dynamic pressure represented by the synthetic dynamic pressure signal 225 is referred to as $Q_{bar(e)}$. As disclosed herein, the CMPE detector 202 uses the synthetic dynamic pressure signal 225 when evaluating whether the synthetic total pressure signal 224 should be output instead of the voted pitot tube signal 220. The synthetic pressure signal generator 222 generates the synthetic total pressure signal 224 based on static pressure $P_s$ measured at the static ports 124 of the aircraft 100 and the estimated dynamic pressure data 225.

The example CMPE control system 200 of FIG. 2 includes a synthetic angle of attack (AoA) estimator 228. The synthetic AoA estimator 228 can be implemented by the flight control system 204. The synthetic AoA estimator 228 provides means for generating an estimated angle of attack $\alpha_{est}$ using sensor data other than the data collected by the angle of attack sensors 126 of the aircraft 100 of FIG. 1. For example, the synthetic AoA estimator 228 calculates the estimated angle of attack $\alpha_{est}$ based on the total pressure $P_{tot(m)}$ as determined by the pitot tubes 112 as disclosed in U.S. application Ser. No. 16/213,406, which is incorporated herein by reference in its entirety. Estimated angle of attack $\alpha_{est}$ data 230 can be stored in a database 232 that is in a location accessible to the synthetic AoA estimator 228, as shown in FIG. 2. In some examples, the databases 218, 232 are the same database.

The CMPE detector 202 of FIG. 2 provides means for detecting if a common mode pneumatic event has occurred (e.g., a majority of the pitot tubes 112 are blocked). In the example of FIG. 2, the CMPE detector 202 accesses the signal data 212, 214, 216 from the individual pitot tubes 112; the voted dynamic pressure signal 221 generated by the ADRF controller 208; the synthetic dynamic pressure signal 225 generated by the synthetic pressure signal generator 222; and the estimated angle of attack data 230 generated by the synthetic AoA estimator 228. As disclosed herein, the CMPE detector 202 also accesses dynamic pressure data 248 calculated by the calculator 210 (which may be based on the voted pitot tube signal 220 or the synthetic total pressure signal 224, as discussed herein). The signal data 212, 214, 216, 220, 221, 224, 230, 248 can be received by the CMPE detector 202 and stored in the database 232.

The example CMPE detector 202 of FIG. 2 includes a signal monitor 234. The signal monitor 234 calculates a rate of change of each of the pressure signals 212, 214, 216 from the respective pitot tubes 112 over time. The signal monitor 234 analyzes the individual rates of change of the pressure signals 212, 214, 216 to identify if a rapid drop in pressure readings has occurred at any of the pitot tubes 112. In particular, the signal monitor 234 compares the rates of change of the respective pressure signals 212, 214, 216 to rate of change threshold data 236 stored in the database 232. The rate of change threshold data 236 can be defined by user inputs.

If any of the rates of change of the pitot tubes exceeds the corresponding rate of change threshold, the signal monitor 234 determines that a common mode pneumatic event may have occurred. In particular, the signal monitor 234 uses the rates of change of the pressure signals 212, 214, 216 to detect asynchronous rapid drops in pressure measurements between the individual pitot tubes 112. For example, if a pressure drop in the first pressure signal data 212 from the first pitot tube 114 detected at a first time exceeds the rate of change threshold, the signal monitor 234 detects a potential blockage event at the first pitot tube 114. If the signal monitor 234 detects a drop in the second pressure signal data 214 from the second pitot tube 116 at a second time after the first time (e.g., seconds later) that exceeds the rate of change threshold, the signal monitor 234 detects a potential blockage event at the second pitot tube 116. In the example of FIG. 2, if the signal monitor 234 detects the asynchronous rapid drops in pressure measurements at a majority of the pitot tubes 112 (e.g., two of three of the pitot tubes are blocked, with the first blockage occurring at a first time and the second blockage occurring within a threshold time thereafter), the signal monitor 234 determines that a common mode pneumatic event has occurred at the pitot tubes 112.

The signal monitor 234 also determines a rate of change of the measured dynamic pressure $Q_{bar(m)}$ (the voted dynamic pressure signal 221) over time and a rate of change of the estimated angle of attack data 230 over time. The signal analyzer compares the rates of change of the voted dynamic pressure signal 221 to corresponding predefined rate of change threshold data 236 for the measured dynamic pressure. The signal monitor 234 compares the rate of change of the estimated angle of attack data 230 to the corresponding predefined rate of change threshold data 236 for the estimated angle of attack data 230.

In the example of FIG. 2, the signal monitor 234 performs a comparative analysis of the respective rates of change of the voted dynamic pressure signal 221 and the angle of attack data 230. For instance, if the signal monitor 234 identifies (a) a drop in the measured dynamic pressure $Q_{bar(m)}$ that exceeds the corresponding rate of change threshold and (b) an increase in a rate of change of the estimated angle of attack data 230 that exceeds a corresponding rate of change threshold for the angle of attack data 230, then the signal monitor 234 determines that a common mode pneumatic event has occurred. Such a relationship between the rates of change of the voted dynamic pressure signal data 221 and the angle of attack data 230 can indicate synchronous rapid drops in pressure at a majority of the pitot tubes 112 (e.g., the first, second, and third pitot tubes 112 are blocked at the same time).

The example CMPE detector 202 of FIG. 2 includes a latch controller 237. The latch controller 237 provides means for controlling a state of a latch 238 (e.g., an electronic logic circuit). In the example of FIG. 2, the latch controller 237 determines a state of the latch 238 in response to the detection of the common mode pneumatic event by the signal monitor 234. As disclosed herein (FIGS. 3 and 4), the latch controller 237 executes latch control logic or rules 240 to determine whether the latch 238 should be set to a first state in which the latch 238 outputs a first latch signal 244 indicative of an absence of a common mode pneumatic event or a second state in which the latch 238 outputs a second latch signal 245 indicative of a presence of a common mode pneumatic event. In examples disclosed herein, the state of the latch 238 and the corresponding signals 244, 245 determine whether the ADRF controller 208 outputs the voted pitot tube signal 220 or the synthetic total pressure signal 224 for use in determining metrics such as airspeed.

The latch control rules 240 define criteria for setting the latch 238 in the first state or the second state. As disclosed herein (FIG. 3), the latch control rules 240 define a time limit or duration of time during which the synthetic total pressure signal 224 is to be output. The latch control rules 240 also define a number of times that the latch 238 can be set in the second state to cause the synthetic total pressure signal 224 to be output. The latch control rules 240 can be defined based on user input(s) and stored in the database 232.

The example ADRF controller 208 of FIG. 2 includes a relay switch 242 in communication with the latch 238. In the example of FIG. 2, the synthetic total pressure signal 224 is transmitted to the relay switch 242. Also, the relay switch 242 receives the voted pitot tube signal 220 from the pitot source selector 211. In examples disclosed herein, the relay switch 242 outputs the voted pitot tube signal 220 in response to the first latch signal 244 from the latch 238 indicating that the latch 238 is in the first state, or the state indicating that no common mode pneumatic event has been detected (e.g., common mode pneumatic event detection is false). In such examples, the calculator 210 of FIG. 2 uses the measured total pressure from the voted pitot tube signal data 220 to calculate parameters such as airspeed of the aircraft 100.

The relay switch 242 outputs the synthetic total pressure signal 224 in response to the second latch signal 245 from the latch 238 indicating that the latch 238 is in the second state, or the state indicating that a common mode pneumatic event has been detected (e.g., common mode pneumatic event detection is true). As a result, the calculator 210 of FIG. 2 uses the synthetic total pressure signal data 224 (e.g., estimated total pressure) to calculate metrics such as airspeed. Thus, although the signal monitor 234 has detected a common mode pneumatic event at the pitot tubes 112, the effect of the common mode pneumatic event on the airspeed metrics (e.g., a sudden drop in airspeed) is suppressed for a period of time by use of the synthetic total pressure signal data 224 instead of the pitot-tube generated signal data 220.

In instances in which the latch 238 is set to cause the relay switch 242 to output the synthetic total pressure signal 224 (i.e., the latch 238 is in the second state), the latch controller 237 executes the latch control rules 240 to determine if the latch 238 should be reset to cause the relay switch 242 to output the voted pitot tube signal 220 (i.e., return the latch 238 to the first state). The CMPE detector 202 includes a timer 239. As disclosed herein (FIG. 4), the latch 238 is reset to the first state to cause the voted pitot tube signal 220 to be output instead of the synthetic total pressure signal 224 based on one or more rules, such as a time limit for the latch 238 to be in the second state, and/or changes in pressure readings at the pitot tubes 112 indicating that the common mode pneumatic event has been resolved.

In the example of FIG. 2, the voted pitot tube signal 220 (i.e., measured total pressure) and the synthetic dynamic pressure signal 225 are also transmitted to the common mode monitor 206 of the aircraft 100. The common mode monitor 206 calculates dynamic pressure based on the static pressure $P_s$ measured at the static ports 124 and the Mach number in signal 248 (where signal 248 includes metrics generated by the calculator 210). The common mode monitor 206 compares the calculated dynamic pressure to the synthetic dynamic pressure to determine if a common mode failure has occurred, which is indicative of a blockage event at the pitot tubes 112 due to icing, debris, a bird strike, etc. In some examples, the common mode monitor 206 determines a difference between the dynamic pressure calculated by the common mode monitor 206 based on the static pressure $P_s$ measured at the static ports 124 and the Mach number in signal 248 and the estimated dynamic pressure $Q_{bar(e)}$ of the synthetic dynamic pressure signal 225. If the differences between the calculated dynamic pressure and the estimated or synthetic dynamic pressure exceeds a threshold pressure difference value for a threshold period of time, the common mode monitor 206 determines that a CMPE has occurred. The threshold pressure difference value can define certain percentage level difference between the calculated dynamic pressure and the estimated dynamic pressure (e.g., up to an allowable percentage difference). The threshold time period can include, for instance, a few seconds to a few minutes. The threshold pressure difference value and the threshold period of time can be defined by user input(s) and stored in the database 218 or the database 232.

The common mode monitor 206 also receives the latch signals 244, 245 from the latch 238 indicating a state of the latch 238 and, thus, the selected signal data output by the relay switch 242 (i.e., the voted pitot tube signal 220 or the synthetic total pressure signal 224). The common mode monitor 206 generates an operational mode signal 246 based on the state of the latch 238 and the detection of the common mode pneumatic event by the common mode monitor 206.

The operational mode signal 246 indicates whether the aircraft 100 should operate in (a) a normal operation mode in which no common mode pneumatic event has been detected; (b) an extended normal operation mode in which a common mode pneumatic event has been detected but the latch 238 is set to cause the relay switch 242 to output the synthetic total pressure signal 224 for a period of time, thereby temporarily suppressing the common mode pneumatic event; or (c) a secondary operation mode in which a common mode pneumatic event has been detected but is no longer suppressed by the output of the synthetic total pressure signal 224 because, for instance, the time limit for outputting the synthetic total pressure signal 224 has expired and the voted pitot tube signal 220 is output by the relay switch 242. The operational mode signal 246 is transmitted to one or more systems of the aircraft 100, such as an autoflight control system 250 and/or an autothrottle control system 252 to instruct the systems 250, 252 with respect to the operational modes. Thus, in examples disclosed herein, the CMPE detector 202 augments the analysis performed by the common mode monitor 206 in detecting common mode pneumatic events by enabling the aircraft 100 to operate in the extended normal mode for a period of time to accommodate potential resolution of the common mode pneumatic event before alerting the pilot.

As discussed herein, the calculator 210 of the CMPE detector 202 of FIG. 2 uses the measured total pressure data of the voted pitot tube signal 220 or the estimated total pressure data of the synthetic total pressure signal 224 to calculate airspeed metrics 248 such as an Mach number, a calibrated airspeed of the aircraft 100, and a true airspeed of the aircraft 100. The calculator 210 also calculates dynamic pressure based on static pressure data and one of the measured total pressure (i.e., the voted pitot tube signal 220) or the synthetic total pressure (i.e., the synthetic total pressure signal 224) that is output based on the state of the latch 238. The metrics 248 can be transmitted to, for instance, the autoflight control system 250 and/or the autothrottle control system 252 of the aircraft 100. In some examples, the metrics 248 are output for viewing by a pilot of the aircraft 100 via one or more display user interface(s) 254. In some examples, the airspeed metrics 248 are used by the flight control system 204 and/or other flight control systems of the aircraft 100 to determine primary control laws 256 for the aircraft 100. In the example of FIG. 2, the dynamic pressure calculated by the calculator 210 based on the measured or estimated total pressure is provided to the CMPE detector 202 as feedback when determining a state of the latch 238.

Figure 3:
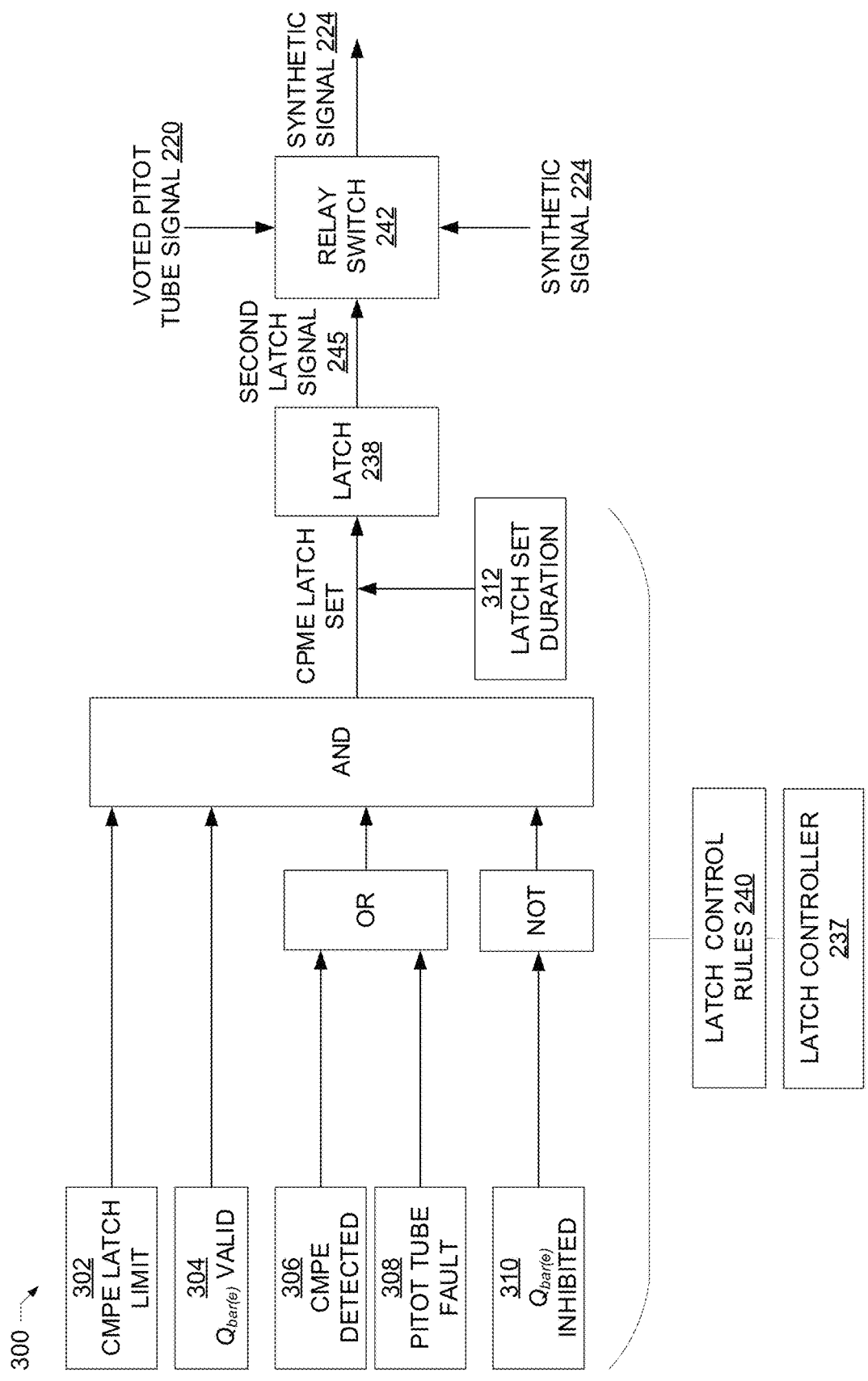
FIG. 3 is a block diagram of example control rules that are implemented by the example common mode pneumatic event detector of FIG. 2 to cause a synthetic pressure signal to be output.

FIG. 3 is a block diagram 300 illustrating the example latch control logic or rules 240 that are executed by the latch controller 237 of the example CMPE detector 202 of FIG. 2 to determine a state of the latch 238. In particular, the latch controller 237 executes the latch control rules 240 to determine if the latch 238 should be set to cause the relay switch 242 of the ADRF controller 208 of FIG. 2 to output the synthetic total pressure signal 224 instead of the voted pitot tube signal 220 in response to the detection of a common mode pneumatic event at the pitot tubes 112 of the aircraft 100 of FIG. 1. In the example of FIG. 3, the latch 238 is considered in the first state when the first latch signal 244 is output by the latch 238, which causes the relay switch 242 to output the voted pitot tube signal 220.

The latch control rules 240 define a CMPE latch limit 302, or a number of times that the latch 238 can be set to cause the relay switch 242 to output the synthetic total pressure signal 224 in response to the second latch signal 245 from the latch 238. In examples disclosed herein, the rules 240 limit the number of times that the synthetic total pressure signal 224 is used instead of the voted pitot tube signal 220 to prevent overuse of the synthetic total pressure signal 224 from masking recurring problems at the pitot tubes 112 of the aircraft 100 of FIG. 1, such as icing or blockage due to debris. In some examples, the CMPE latch limit 302 is set to a predefined maximum limit of occurrences or events (i.e., the latch 238 can be set a threshold number of times during flight to cause the synthetic total pressure signal 224 to be used instead of the voted pitot tube signal 220). The CMPE latch limit 302 can be defined based on user inputs and stored in the database 232.

The latch control rule(s) 240 include a validity check with respect to the estimated dynamic pressure $Q_{bar(e)}$, or a $Q_{bar(e)}$ valid rule 304. In some examples, a validity or accuracy of the dynamic estimated pressure $Q_{bar(e)}$ (i.e., the synthetic dynamic pressure signal 225) determined by the synthetic pressure signal generator 222 of FIG. 2 can be affected by, for instance, inaccuracies in the data collected by the angle of attack sensors 126 and/or engine pressure sensors of the aircraft 100 of FIG. 1. The $Q_{bar(e)}$ valid rule 304 defines expected pressure values for the dynamic estimated pressure $Q_{bar(e)}$ based on, for example, reference or calibration data.

The latch control rules 240 includes rules to confirm that the signal monitor 234 of the CMPE detector 202 has detected a common mode pneumatic event. The example rules 240 include a CMPE detector rule 306. The CMPE detector rule 306 is met when the signal monitor 234 identifies a common mode pneumatic event based on the rate of change of the voted dynamic pressure signal 221 and the rate of change of the estimated angle of attack data 230. As disclosed herein, the comparison of the rates of change of the voted dynamic pressure signal 221 and the estimated angle of attack data 230 can indicate that a majority of the pitot tubes 112 are concurrently blocked (e.g., two or more of the pitot tubes are blocked by ice at the same time).

The example latch control rules 240 include a pitot tube fault rule 308. The pitot tube fault rule 308 is met when the signal monitor 234 detects asynchronous drops in pressure measurements at two or more of the pitot tubes 112 based on analysis of the individual rates of change of the pressures signals 212, 214, 216 from the pitot tubes 112, as discussed in connection with FIG. 2.

In some examples, pitot tube fault rule 308 includes logic defining that two or more pitot tubes are to experience a rapid drop in pressure to set the latch 238 to output the synthetic total pressure signal 224. For instance, if one pitot tube out of three pitot tubes is inoperative, the logic can define that the two remaining tubes should experience a rapid drop for a CMPE to be detected. As another example, if one pitot tube out of two pitot tubes is inoperative, the logic can define that the other remaining tube should experience a rapid drop for a CMPE to be detected. Such logic prevents, for instance, a single inoperative tube (or a number of inoperative tubes that are less than a majority) from interfering with the analysis performed by the CMPE detector 202 because the aircraft may still operate with one pitot tube out of service.

In some examples, the CMPE detector rule 306 and the pitot tube fault rule 308 are assigned time limits for which the values of the rules 306, 308 will remain true when executed by the latch controller 237. Such time limits prevent the rules 306, 308 from interfering with decisions by the latch controller 237 to set the latch 238 to output the synthetic total pressure signal 224 or to reset the latch 238 to the first state after the latch 238 is set to the second state (i.e., the state that causes the relay switch 242 to output the synthetic signal). For example, if the CMPE detector rule 306 were always true, then then the latch controller 237 could be prevented from resetting the latch 238.

As another example, the pitot tube fault rule 308 may remain true for a period of time to enable asynchronous pitot tube blockages to be detected. For instance, if a blockage occurs a first pitot tube, the pitot tube fault rule 308 for the first pitot tube will be true for, for instance, x seconds. If y seconds later, a blockage occurs at a second pitot tube, the pitot tube fault rule 308 for the second pitot tube will be true. Because two of the pitot tubes are blocked, the latch controller 237 sets the latch to output the synthetic total pressure signal 224 (i.e., assuming the other latch control rules 240 are satisfied). In this example, if the pitot tube fault rule 308 for the first pitot tube was not held at a true value for the period of time of x seconds, then the blockages at the first and second pitot tubes would have to occur at the same time for the latch controller 237 to set the latch 238. Thus, the time limits associated with the rules 306, 308 provide for increased accuracy in determining the state of the latch.

The latch control rule(s) 240 include an estimated dynamic pressure $Q_{bar(e)}$ inhibited rule 310. The $Q_{bar(e)}$ inhibited rule 310 specifies that if the difference between the estimated dynamic pressure $Q_{bar(e)}$ (i.e., the synthetic dynamic pressure signal 225) and the dynamic pressure calculated by the calculator 210 (e.g., signal 248) is greater than a predefined threshold, use of the synthetic total pressure signal 224 is prohibited. As noted above, the calculator 210 calculates the dynamic pressure based on static pressure and the total pressure associated with the one of the voted pitot tube signal 220 or the synthetic total pressure signal 224 (i.e., depending on the state of the latch 238). For instance, if there is more than a predefined percent difference between the estimated dynamic pressure $Q_{bar(e)}$ and the dynamic pressure calculated by the calculator 210, the $Q_{bar(e)}$ inhibited rule 310 specifies that the synthetic total pressure signal 224 should not be used even if the other latch control rules 302, 304, 306, 308 are met. In some examples, the estimated dynamic pressure $Q_{bar(e)}$ value and the dynamic pressure value analyzed by the latch controller 237 when executing the $Q_{bar(e)}$ inhibited rule 310 are associated with a lag filter (e.g., an n second lag). As a result of the lag filter, the pressure values that are compared by the latch controller 237 when executing the rule 310 are values obtained before the common mode pneumatic event occurs at the pitot tubes 112 and the measured dynamic pressure $Q_{bar(m)}$ is affected by the event.

In the example of FIG. 3, the latch controller 237 executes the rules 302, 304, 306, 308, 310 to determine if the latch 238 should be set to the second state such that the second latch signal 245 transmitted by the latch 238 causes the relay switch 242 to output the synthetic total pressure signal 224 instead of the voted pitot tube signal 220. In FIG. 3, if the latch controller 237 determines that (a) the CMPE latch limit has not been met (rule 302); (b) the estimated dynamic pressure $Q_{bar(e)}$ is valid (rule 304); (c) one of the CMPE detect rule 306 or the pitot tube fault rule 308 has been satisfied, thereby indicating the occurrence of a common mode pneumatic event; and (d) use of the estimated dynamic pressure $Q_{bar(e)}$ is not prohibited (rule 310), then the latch controller 237 determines that the latch 238 should be set to cause the relay switch 242 to output the synthetic total pressure signal 224.

In the example of FIG. 3, if any of the conditions defined by the rules 302, 304, 306, 308, 310 is not satisfied, then the latch controller 237 determines that the latch 238 should not be set to enable the synthetic total pressure signal 224 to be output at the relay switch 242. For instance, the latch controller 237 may determine that the CMPE latch limit 302 has been reached such that the latch 238 has been set to the second state the maximum number of times allowed by the limit. In this example, the latch 238 remains in the first state and the voted pitot tube signal 220 is output by the relay switch 242. Thus, when the latch limit 302 is reached, the synthetic total pressure signal 224 is no longer used to suppress a common mode pneumatic event at the pitot tubes 112. If a common mode pneumatic event is detected after the CMPE latch limit 302 is exceeded, the latch controller 237 maintains the latch 238 in the first state and the voted pitot tube signal 220 is output by the relay switch 242. In such instances, the pilot can be alerted (e.g., via the display user interface(s) 254 of FIG. 2) to changes in airspeeds calculated from the measured dynamic pressures $Q_{bar(m)}$ of the voted pitot tube signal 220 and take actions to address the cause of the inaccurate reading(s) at the pitot tubes 112. Also, in examples in which the common mode monitor 206 detects the CMPE, an operational mode of a flight control system is changed (e.g., from a normal operational mode to a secondary operational mode).

In examples in which the latch controller 237 sets the latch 238 in the second state to cause the synthetic total pressure signal 224 to be output at the relay switch 242 in response to the second latch signal 245, the latch 238 remains in the second state for a predefined amount of time corresponding to a time during which the synthetic total pressure signal 224 is to be output at the relay switch 242. The timer 239 of the CMPE detector 202 monitors the time for which the latch 238 is in the second state. When the timer 239 determines that the time period has expired, the latch controller 237 resets the latch 238 to the first state to cause the voted pitot tube signal 220 to be output at the relay switch 242. The latch control rules 240 include a latch set duration rule 312. The latch set duration rule 312 defines a maximum amount of time that the latch 238 can remain in the second state (e.g., n seconds). The duration can be defined based on an expected time for a pitot tube to recover from an icing or other blockage event at the pitot tube such that the pressure represented by the voted pitot tube signal 220 can be considered accurate again. For instance, the latch set duration rule 312 can be defined based on an expected time for the ice at the pitot tube to be melted by the heater and the sensor readings to return to accurate readings.

Figure 4:
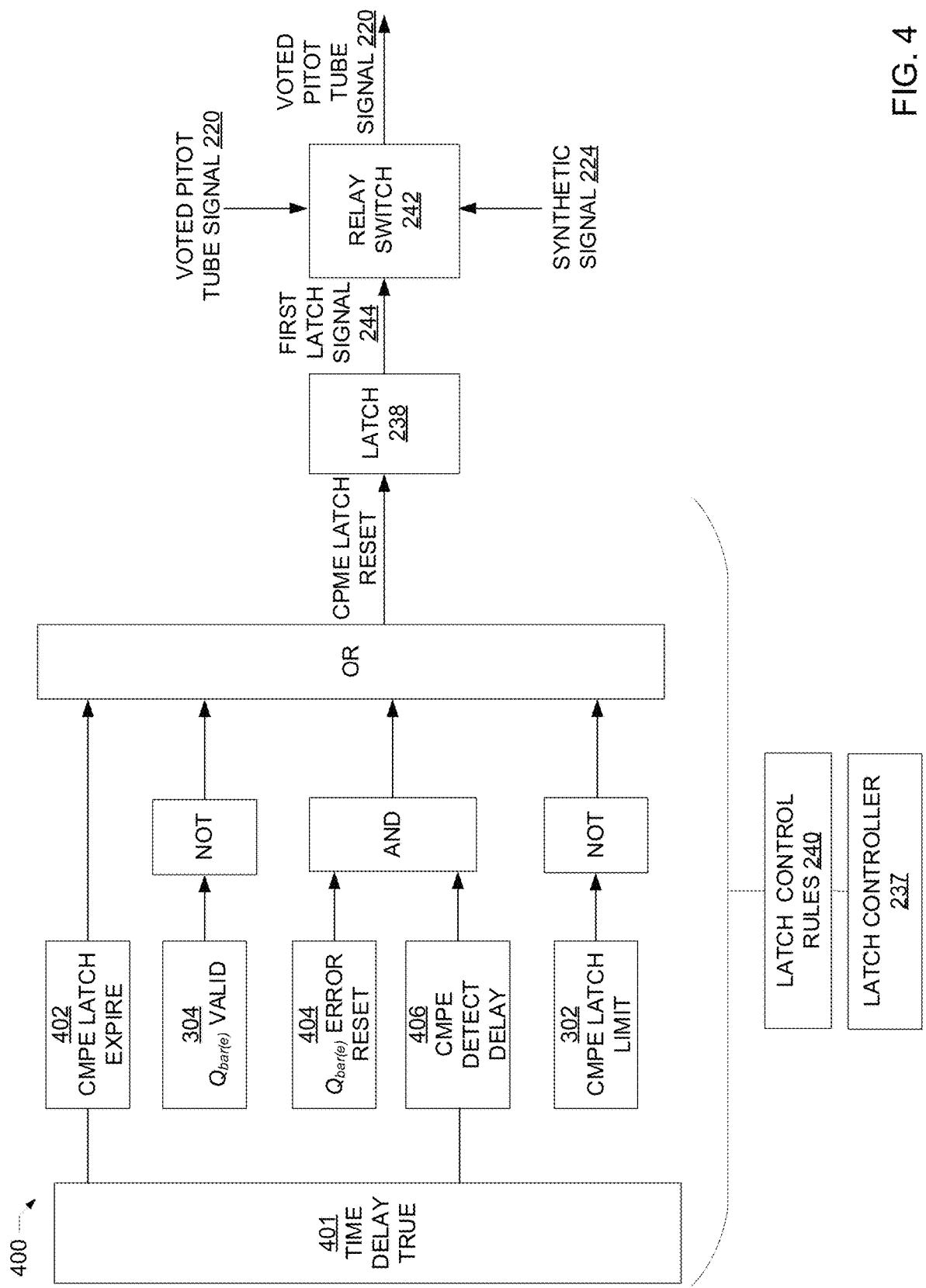
FIG. 4 is a block diagram of example control rules that are implemented by the example common mode pneumatic event detector of FIG. 2 to cause a pressure signal generated by the pitot tubes of the air vehicle of FIG. 1 to be output.

FIG. 4 is a block diagram 400 illustrating the example latch control logic or rules 240 that are executed by the latch controller 237 of the example CMPE detector 202 of FIG. 2 to determine if the latch 238 should be reset such that the first latch signal 244 is output by the latch 238 to cause the relay switch 242 to switch from outputting the synthetic total pressure signal 224 to outputting the voted pitot tube signal 220. Put another away, the latch 238 returns from the second state to the first state when the latch 238 is reset.

As disclosed herein, the latch 238 is set to cause the relay switch 242 to output the synthetic total pressure signal 224 for a period of time (e.g., n seconds) defined by the latch set duration rule 312 as discussed in FIG. 3. Put another way, the time limit for which the latch 238 is set in the second state corresponds to a time for which the relay switch 242 outputs the synthetic total pressure signal 224. Thus, in the example of FIG. 4, a time delay during which the common mode pneumatic event is suppressed is true (rule 401). The latch control rules 240 include a CMPE latch expiration rule 402. The CMPE latch expiration rule 402 states that if the time limit for which the latch 238 is to be set has expired, the latch 238 should be reset.

In some examples, the latch 238 is reset (i.e., returned to the first state) by the latch controller 237 prior to expiration of the time limit defined by the latch set duration rule 312 (FIG. 3). For example, the latch controller 237 applies the $Q_{bar(e)}$ valid rule 304 to the synthetic dynamic pressure signal 225 as the data is generated by the synthetic pressure signal generator 222 over time. In some examples, the latch controller 237 determines that the estimated dynamic pressure $Q_{bar(e)}$ associated with the synthetic dynamic pressure signal 225 does not satisfy the $Q_{bar(e)}$ valid rule 304 after the latch 238 has been set to the second state (e.g., n seconds after the latch 238 has been set to the second state). In such examples, the latch controller 237 determines that the latch 238 should be reset because the synthetic dynamic pressure signal 225 is no longer accurate. As a result, the time delay 401 associated with suppression of the common mode pneumatic event via the use of the synthetic total pressure signal 224 ends.

In some examples, the latch 238 is reset if the difference between the measured dynamic pressure $Q_{bar(m)}$ (i.e., the voted dynamic pressure signal 221) and the estimated dynamic pressure $Q_{bar(e)}$ (i.e., the synthetic dynamic pressure signal 225) falls within a predefined threshold, thereby indicating that the common mode pneumatic event at the pitot tubes 112 (FIG. 1) has been resolved before expiration of the latch time limit 402. The example latch control rules 240 include a $Q_{bar(e)}$ error reset rule 404 defining the threshold pressure difference between the measured dynamic pressure $Q_{bar(m)}$ and the estimated dynamic pressure $Q_{bar(e)}$ such that, when the threshold is satisfied, the measured dynamic pressure $Q_{bar(m)}$ can be considered an accurate pressure measurement. For instance, the $Q_{bar(e)}$ error reset rule 404 can indicate that if the difference between the measured dynamic pressure $Q_{bar(m)}$ and the estimated dynamic pressure $Q_{bar(e)}$ is less than a predefined percent, then the latch 238 should be reset. Thus, if the latch controller 237 determines that the difference between the measured dynamic pressure $Q_{bar(m)}$ and the estimated dynamic pressure $Q_{bar(e)}$ is within the threshold defined by the $Q_{bar(e)}$ error reset rule 404, the latch controller 237 determines that the latch 238 should be reset to the first state. In such examples, the time delay 401 associated with suppression of the common mode pneumatic event via the use of the synthetic total pressure signal 224 ends and the voted pitot tube signal 220 is output at the relay switch 242.

In the example of FIG. 4, the latch control rules 240 define a CMPE detection delay value 406 that defines a time after which the latch controller 237 can execute the $Q_{bar(e)}$ error reset rule 404 (e.g., x seconds). The CMPE detection delay value 406 accounts for a delay between a time at which the common mode pneumatic event is detected by the signal monitor 234 of the CMPE detector 202 and the time that the latch controller 237 instructs the latch 238 to be set to the second state in response to the detection of the common mode pneumatic event. After the time associated with the CMPE detection delay value 406 has passed, the latch controller 237 executes the $Q_{bar(e)}$ error reset rule 404 using the measured dynamic pressure $Q_{bar(m)}$ values that are generated after the time defined by CMPE detection delay value 406. The latch controller 237 determines if the measured dynamic pressure $Q_{bar(m)}$ values are within the threshold defined by the $Q_{bar(e)}$ error reset rule 404. If the measured dynamic pressure $Q_{bar(m)}$ values satisfy the $Q_{bar(e)}$ error reset rule 404, the latch controller 237 determines that the pitot tubes 112 have recovered from the common mode pneumatic event and the data output by the pitot tubes 112 can be considered accurate.

In some examples, the latch controller 237 determines that the latch 238 should be reset if the CMPE latch limit rule 302 indicates that further attempts to set the latch 238 to cause the synthetic total pressure signal 224 to be output are no longer permitted. Put another way, the latch controller 237 determines that the latch 238 should be reset if the latch 238 has been set a number of times exceeding the limit 302 (e.g., n times). In this example, the CMPE latch limit 302 serves as an additional check to prevent the latch 238 from being erroneously set and, thus, the synthetic total pressure signal 224 from being output, even if other criteria for setting the latch 238 as discussed in connection with FIG. 3 have been met. For example, if the latch controller 237 determines that a common mode pneumatic event has been detected (rule 306 of FIG. 3) but the CMPE latch limit 302 no longer permits the latch 238 to be set to the second state, then the latch controller 237 instructs the latch 238 to be reset (e.g., so as not to hide or mask recurring common mode pneumatic events).

Thus, examples disclosed herein provide for multiple criteria for controlling the state of the latch 238 and, in particular, for controlling when the latch 238 should be set to enable the synthetic total pressure signal 224 to be output by the relay switch 242 or when the latch 238 should be reset to cause the relay switch 242 to return to outputting the voted pitot tube signal 220. The multiple criteria checks provide for increased confidence levels with respect to decision by the CMPE detector 202 as to whether the voted pitot tube signal 220 or the synthetic total pressure signal 224 should be used. Further, the latch control rules 240 account for recovery of the pitot tubes 112 from the common mode pneumatic event so that the measured dynamic pressure $Q_{bar(m)}$ from the pitot tubes 112 serves as a primary indicator of conditions at the aircraft.

While an example manner of implementing the CMPE detector 202 is illustrated in FIG. 2, one or more of the elements, processes and/or devices illustrated in FIG. 2 may be combined, divided, re-arranged, omitted, eliminated and/or implemented in any other way. Further, the example database 232, the signal monitor 234, the example latch controller 237, the example latch 238, the example timer 239, and/or, more generally, the example CMPE detector 202 of FIG. 2 may be implemented by hardware, software, firmware and/or any combination of hardware, software and/or firmware. Thus, for example, any of the example database 232, the signal monitor 234, the example latch controller 237, the example latch 238, the example timer 239, and/or, more generally, the example CMPE detector 202 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example database 232, the signal monitor 234, the example latch controller 237, the example latch 238, and/or the example timer 239 is/are hereby expressly defined to include a non-transitory computer readable storage device or storage disk such as a memory, a digital versatile disk (DVD), a compact disk (CD), a Blu-ray disk, etc. including the software and/or firmware. Further still, the example CMPE detector 202 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
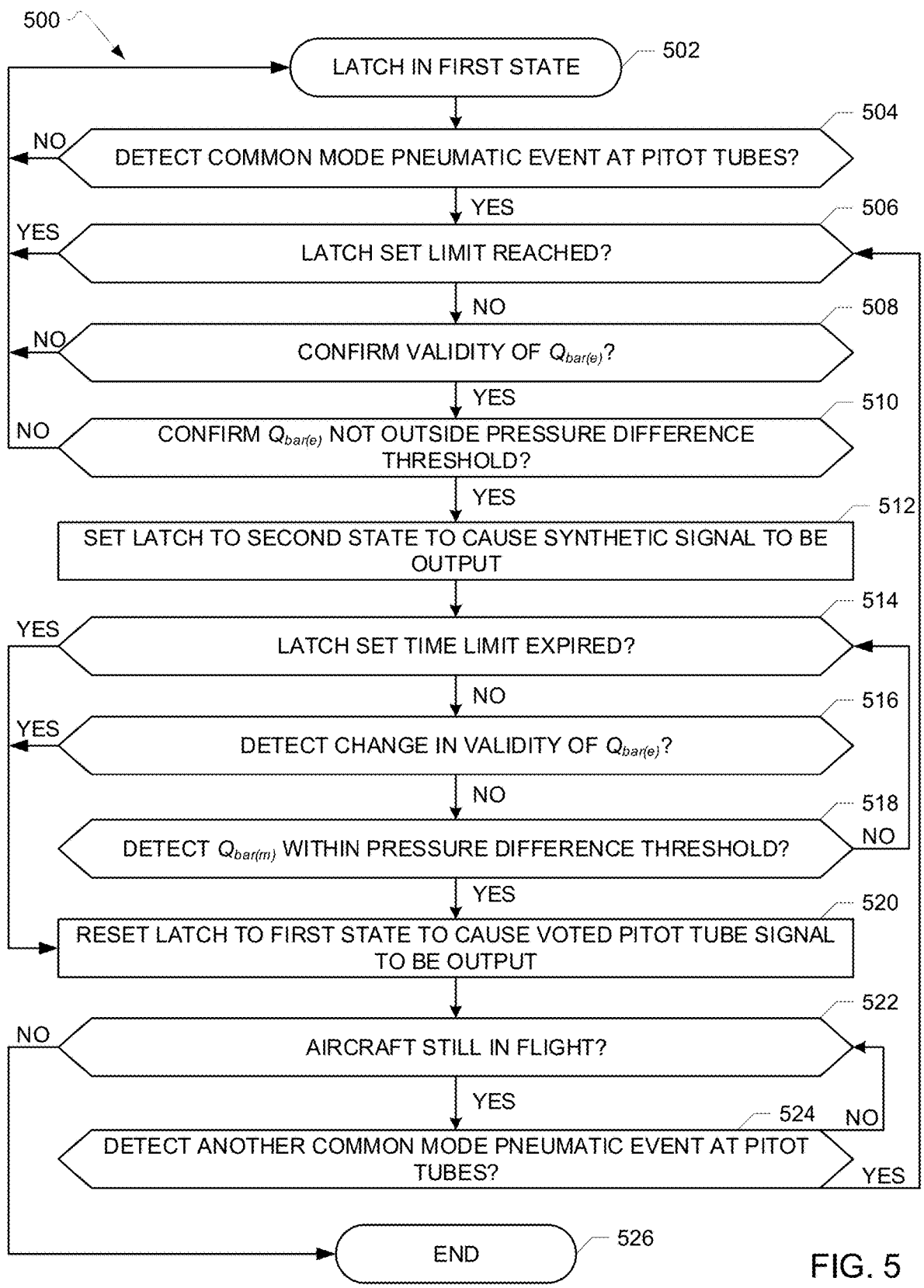
FIG. 5 is a flowchart representative of machine readable instructions which may be executed to implement the example common mode pneumatic event detector of FIG. 2.

A flowchart representative of example hardware logic, machine readable instructions, hardware implemented state machines, and/or any combination thereof for implementing the CMPE detector 202 of FIG. 2 is shown in FIG. 5. The machine readable instructions may be one or more executable programs or portion(s) of an executable program for execution by a computer processor and/or processor circuitry, such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example latch controller 237 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIG. 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart of example instructions 500 that can be executed by the CMPE detector 202 of FIG. 2 (e.g., the signal monitor 234, the latch controller 237) to control output of a measured total pressure signal (e.g., the voted pitot tube signal 220) or an estimated total pressure signal (e.g., the synthetic total pressure signal 224) for use in determining airspeed metrics of an aircraft (e.g., the aircraft 100 of FIG. 1). The example instructions 500 begin with the latch 238 in a first state, or a state in which the first latch signal 244 is output by the latch 238 to cause the relay switch 242 of the ADRF controller 208 to output the voted pitot tube signal 220 (block 502).

In the example of FIG. 5, the latch 238 remains in the first state until the signal monitor 234 of the CMPE detector 202 detects a common mode pneumatic event at the pitot tubes 112 of the aircraft 100 (e.g., when a majority of the pitot tubes 112 are blocked) (block 504). The signal monitor 234 can identify a common mode pneumatic event based on the rate of change of the voted dynamic pressure signal 221 and the rate of change of the estimated angle of attack data 230. In such examples, the latch controller 237 determines that the CMPE detector rule 306 of the latch control rules 240 is satisfied. In other examples, the signal monitor 234 detects the common mode pneumatic event based on analysis of the individual rates of change of the pressures signals 212, 214, 216 from the pitot tubes 112. In such examples, the latch controller 237 determines that the pitot tube fault rule 308 of the latch control rules 240 is satisfied.

In examples in which a common mode pneumatic event is detected, the latch controller 237 performs a series of checks to confirm that the latch 238 should be set in the second state to cause the synthetic total pressure signal 224 to be output at the relay switch 242. For instance, the latch controller 237 confirms that the limit for setting the latch 238 in the second state has not been reached (block 506). The latch control rules 240 include CMPE latch limit 302 that defines the number of times that the latch 238 can be set to cause the relay switch 242 to output the synthetic total pressure signal 224 in response to the second latch signal 245 from the latch 238. In the example of FIG. 5, if the CMPE latch limit 302 has been reached, the latch controller 237 maintains the latch 238 in the first state.

The latch controller 237 confirms a validity or accuracy of the dynamic estimated pressure $Q_{bar(e)}$ generated by the synthetic pressure signal generator 222 based on the $Q_{bar(e)}$ valid rule 304 and reference estimated pressure data (block 508). The latch controller 237 confirms that use of the synthetic total pressure signal 224 is not prohibited based on the $Q_{bar(e)}$ inhibited rule 310, which indicates that if the difference between the estimated dynamic pressure $Q_{bar(e)}$ and the dynamic pressure calculated by the calculator 210 (e.g., signal 248) is greater than a predefined threshold, use of the synthetic total pressure signal 224 is prohibited (block 510).

In the example of FIG. 5, if any of the latch control rules 304, 310 are not satisfied, latch controller 237 maintains the latch 238 in the first state. If the rules 302, 304, 308, 310 in blocks 504-508 are satisfied, the latch controller 237 sets the latch 238 in the second state (block 512). In the second state, the second latch signal 245 is output by the latch 238 to cause the relay switch 242 to output the synthetic total pressure signal 224.

The latch controller 237 of FIG. 2 also determines when the latch 238 should be reset to enable the relay switch 242 to switch or return to outputting the voted pitot tube signal 220. In the example of FIG. 5, the latch set duration rule 312 defines a maximum amount of time for which the latch 238 is to remain in the second state. The latch set duration rule 312 corresponds to a maximum amount of time that the synthetic total pressure signal 224 is to be output to prevent the synthetic total pressure signal 224 from hiding ongoing blockage problems at the pitot tubes 112. If the timer 239 of the CMPE detector 202, determines that the latch set time limit has expired, the latch controller 237 resets the latch 238 to the first state (blocks 514, 520).

If the duration for which the latch 238 can be set in the second state has not yet expired, the latch controller 237 performs other checks to determine if the latch 238 should be reset to the first state. The latch controller 237 applies the $Q_{bar(e)}$ valid rule 304 to the synthetic dynamic pressure signal 225 as the data is generated by the synthetic pressure signal generator 222 over time to determine if there are any changes in the validity of the synthetic dynamic pressure signal 225 that would warrant resetting the latch 238 to cause output of the synthetic total pressure signal 224 to end (blocks 516, 520).

The latch controller 237 executes the $Q_{bar(e)}$ error reset rule 404 to determine difference between the measured dynamic pressure $Q_{bar(m)}$ (i.e., the voted dynamic pressure signal 221) associated with the voted pitot tube signal 220 and the estimated dynamic pressure $Q_{bar(e)}$ of the synthetic total pressure signal 224 falls within a predefined threshold, thereby indicating that the common mode pneumatic event at the pitot tubes 112 has been resolved before expiration of the latch time limit. If the voted pitot tube signal 220 has recovered, the latch controller 237 resets the latch 238 (blocks 518, 520).

The example instructions 500 continue to monitor for common mode pneumatic events at the pitot tubes during flight (block 522, 524). The example instructions 500 end when the aircraft has landed (block 526).

Figure 6:
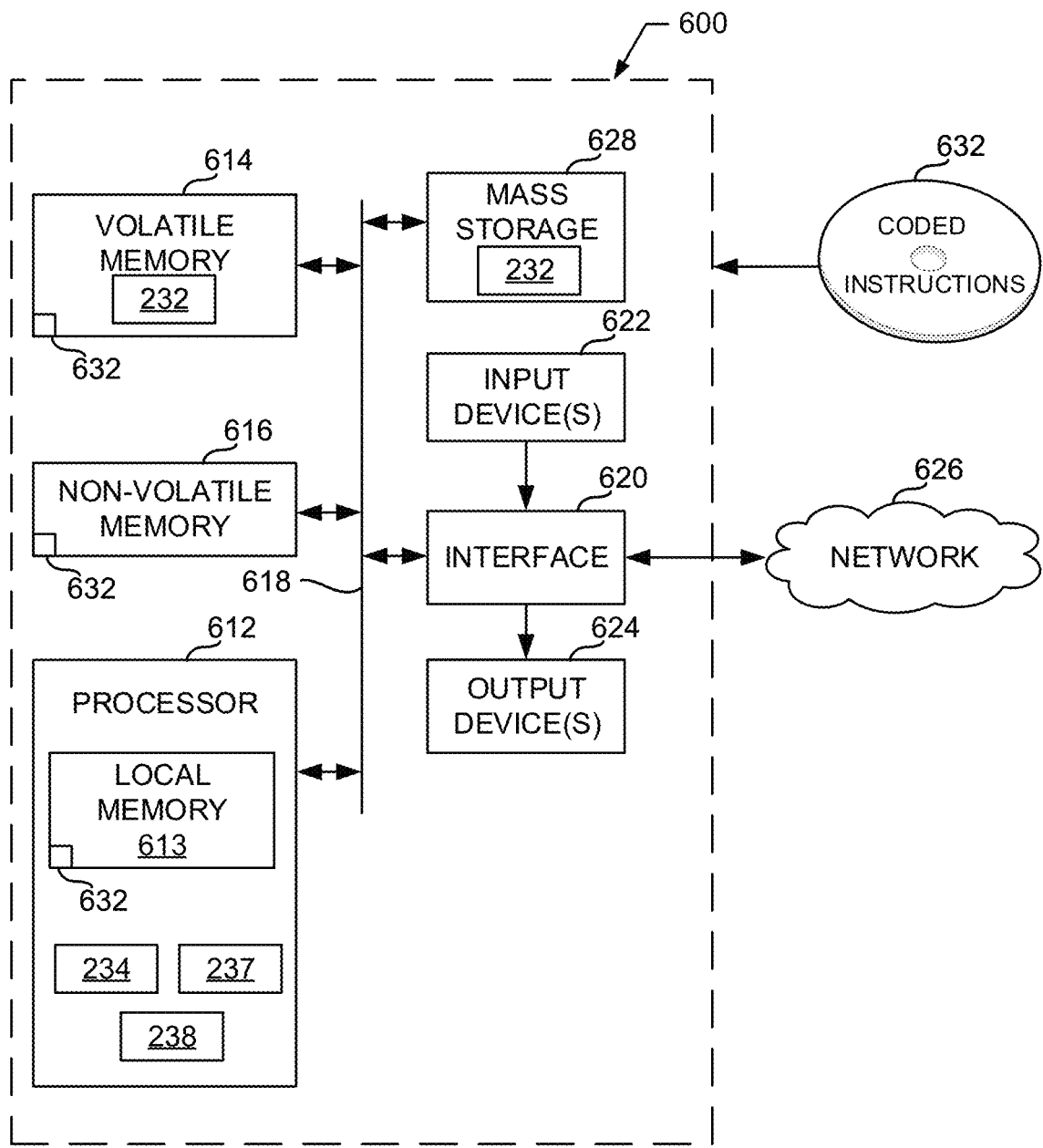
FIG. 6 is a block diagram of an example processing platform structured to execute the instructions of FIG. 5 to implement the example common mode pneumatic event detector of FIG. 2.

FIG. 6 is a block diagram of an example processor platform 600 structured to execute the instructions of FIG. 5 to implement the CMPE detector 202 of FIG. 5. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example signal monitor 234, the example latch controller 237, the example latch 238, and the example timer 239.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

Machine executable instructions 632 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus and articles of manufacture have been disclosed that provide for a flight control system architecture to detect and manage common mode pneumatic events at pitot tubes of an aircraft. In examples disclosed herein, a common mode pneumatic event (CMPE) detector provides for detection of common mode pneumatic events to augment the detection of the common mode pneumatic events by a common mode monitor of the aircraft. In response to detection of a common mode pneumatic event, the example CMPE detector selectively transmits a signal to a relay switch to cause the relay switch to output one of a pressure signal generated by the pitot tubes or an estimated pressure signal. In examples in which the common mode pneumatic event is detected, the estimated pressure signal can be used instead of the actual pressure signal to provide consistent airspeed data to a pilot while blockage events such as icing at the pitot tubes that caused the common mode pneumatic event are resolved. The example CMPE detector disclosed herein executes multiple rules or logic to confirm that the actual pressure signal should be temporarily replaced with the estimated pressure signal and to determine when use of the actual pressure signal should resume. Examples disclosed herein dynamically respond to changes in conditions at the pitot tubes to control the output of the actual pressure signal or the estimated pressure signal.

Example 1 includes a system including a common mode pneumatic event detector to detect a common mode pneumatic event at pitot tubes of an aircraft, a latch, a relay switch in communication with the latch, and a latch controller to set the latch in a first state to cause the latch to output a first latch signal, the relay switch to output a first pressure signal in response to the first latch signal, the first pressure signal based on pressure data from the pitot tubes, and set the latch in a second state to cause the latch to output a second latch signal based on the detection of the common mode pneumatic event. The relay switch is to output a second pressure signal in response to the second latch signal. The second pressure signal includes estimated pressure data.

Example 2 includes the system of example 1, wherein the common mode pneumatic event detector is to detect the common mode pneumatic event based on a respective rate of change of the pressure data associated with the pitot tubes.

Example 3 includes the system of example 2, wherein the pressure data is based on signals from at least three pitot tubes.

Example 4 includes the system of example 1, wherein the common mode pneumatic event detector is to detect the common mode pneumatic event based on a rate of change of estimated angle of attack data, the estimated angle of attack data based on the pressure data from the pitot tubes.

Example 5 includes the system of example 1, wherein the latch controller to determine a limit for a number of times in which the latch is to be set in the second state and refrain from setting the latch in the second state when the limit has been satisfied.

Example 6 includes the system of example 1, wherein the latch controller is to determine a differential between the second pressure signal and the first pressure signal, perform a comparison of the differential to a pressure difference threshold, and set the latch in the first state if the differential satisfies the pressure difference threshold.

Example 7 includes the system of any of examples 1-6, further including a timer to determine a time limit for which the latch is in the second state, the latch controller to set the latch in the first state based on the time limit.

Example 8 includes the system of example 7, wherein the relay switch is to output the second pressure signal for a duration of time corresponding to the time limit.

Example 9 includes the system of any of examples 1-6, further including a calculator to calculate a parameter of the aircraft based on the first pressure signal when the latch is in the first state and calculate the parameter of the aircraft based on the second pressure signal when the latch is in the second state, the parameter including one or more of airspeed, dynamic pressure, or a mach number.

Example 10 includes the system of example 1, further including a common mode monitor to determine an operational mode of a flight control system of the aircraft based on the latch being in the first state or the second state.

Example 11 includes a method including causing a relay switch to output a first pressure signal, the first pressure signal indicative of a pressure measured at one or more pitot tubes of an aircraft, detecting a common mode pneumatic event at the pitot tubes of the aircraft based on the pressure measured at the one or more pitot tubes, and causing the relay switch from outputting the first pressure signal to outputting a second pressure signal in response to the detection of the common mode pneumatic event. The second pressure signal is indicative of an estimated pressure. The second pressure signal is to be used to determine one or more airspeed parameters of the aircraft.

Example 12 includes the method of example 11, further including causing the relay switch to switch from outputting the second pressure signal to outputting the first pressure signal after a predefined period of time.

Example 13 includes the method of example 11, further including determining a pressure difference between the first pressure signal to the second pressure signal, performing a comparison of the pressure difference to a threshold, and causing the relay switch to switch from outputting the second pressure signal to outputting the first pressure signal based on the comparison.

Example 14 includes the method of example 11, further including causing at least one processor to validate the second pressure signal based on reference estimated pressure data.

Example 15 includes a system including an air data reference function controller to generate a pitot tube pressure signal based on pressure signals output by pitot tubes of an aircraft, the air data reference function controller including a relay, a synthetic signal pressure signal generator to generate an estimated pressure signal, a calculator, and a common mode pneumatic event detector in communication with the relay. The common mode pneumatic event detector is to generate a first instruction to cause the air data reference function controller to output the pitot tube pressure signal to the calculator, detect a common mode pneumatic event at the pitot tubes, and generate a second instruction to cause the air data reference function controller to output the estimated pressure signal to the calculator in response to the detection of the common mode pneumatic event. The estimated pressure signal is to replace pitot tube pressure signal. The calculator is to determine an airspeed of the aircraft based on the one of (a) the pitot tube pressure signal or (b) the estimated pressure signal.

Example 16 includes the system of example 15, wherein the common mode pneumatic event detector is to generate a third instruction to cause the air data reference function controller to output the pitot tube pressure signal to the calculator, the pitot tube pressure signal to replace the estimated pressure signal.

Example 17 includes the system of example 16, wherein the common mode pneumatic event detector is to detect an expiration of a time limit for which the air data reference function controller is to output the estimated pressure signal, the common mode pneumatic event detector to generate the third instruction in response to the expiration of the time limit.

Example 18 includes the system of examples 15 or 16, wherein the common mode pneumatic event detector includes a latch, the first instruction based on a first signal generated by the latch when the latch is in a first state and the second instruction based on a second signal generated by the latch when the latch is in a second state.

Example 19 includes the system of example 18, wherein the common mode pneumatic event detector is to change a state of the latch from the first state to the second state in response to the detection of the common mode pneumatic event.

Example 20 includes the system of example 15, wherein the common mode pneumatic event detector is to generate a third instruction to cause the air data reference function controller to output the pitot tube pressure signal to the calculator, the pitot tube pressure signal to replace the estimated pressure signal, determine that a difference between the estimated pressure signal and the pitot tube pressure signal exceeds a threshold, and maintain the third instruction to cause the air data reference function controller to output the pitot tube pressure signal in response to the difference exceeding the threshold.

Example 21 includes the system of example 15, wherein the common mode pneumatic event detector is to generate a third instruction to cause the air data reference function controller to output the pitot tube pressure signal to the calculator, the pitot tube pressure signal to replace the estimated pressure signal, determine that a difference between the estimated pressure signal and the pitot tube pressure signal exceeds a threshold, and maintain the third instruction to provide for the air data reference function controller to output the pitot tube pressure signal in response to the difference exceeding the threshold.

Example 22 includes the system of example 15, wherein the pitot tube pressure signal includes total pressure data.

Example 23 includes a non-transitory computer readable medium comprising instructions that, when executed by at least one processor, cause the at least one processor to cause a relay switch to output a first pressure signal, the first pressure signal indicative of a pressure measured at one or more pitot tubes of an aircraft; detect a common mode pneumatic event at the pitot tubes of the aircraft based on the pressure measured at the one or more pitot tubes; and cause the relay switch from outputting the first pressure signal to outputting a second pressure signal in response to the detection of the common mode pneumatic event. The second pressure signal is indicative of an estimated pressure. The second pressure signal is to be used to determine one or more airspeed parameters of the aircraft.

Example 24 includes the non-transitory computer readable medium of example 23, wherein the instructions, when executed, cause the at least one processor to cause the relay switch to switch from outputting the second pressure signal to outputting the first pressure signal after a predefined period of time.

Example 25 includes the non-transitory computer readable medium of example 23, wherein the instructions, when executed, cause the at least one processor to determine a pressure difference between the first pressure signal and the second pressure signal; and perform a comparison of the pressure difference to a threshold; and cause the relay switch to switch from outputting the second pressure signal to outputting the first pressure signal based on the comparison.

Example 26 includes the non-transitory computer readable medium of example 23, wherein the instructions, when executed, cause the at least one processor to validate the second pressure signal based on reference estimated pressure data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A system comprising:
a common mode pneumatic event detector to detect a common mode pneumatic event at pitot tubes of an aircraft;
a latch;
a relay switch in communication with the latch; and
a latch controller to:
set the latch in a first state to cause the latch to output a first latch signal, the relay switch to output a first pressure signal in response to the first latch signal, the first pressure signal based on pressure data from the pitot tubes; and
set the latch in a second state to cause the latch to output a second latch signal based on the detection of the common mode pneumatic event, the relay switch to output a second pressure signal in response to the second latch signal, the second pressure signal including estimated pressure data.

2. The system of claim 1, wherein the common mode pneumatic event detector is to detect the common mode pneumatic event based on a respective rate of change of the pressure data associated with the pitot tubes.

3. The system of claim 2, wherein the pressure data is based on signals from at least three pitot tubes.

4. The system of claim 1, wherein the common mode pneumatic event detector is to detect the common mode pneumatic event based on a rate of change of estimated angle of attack data, the estimated angle of attack data based on the pressure data from the pitot tubes.

5. The system of claim 1, wherein the latch controller is to: determine a limit for a number of times in which the latch is to be set in the second state; and refrain from setting the latch in the second state when the limit has been satisfied.

6. The system of claim 1, wherein the latch controller is to:
determine a differential between the second pressure signal and the first pressure signal;
perform a comparison of the differential to a pressure difference threshold; and
set the latch in the first state if the differential satisfies the pressure difference threshold.

7. The system of claim 1, further including a timer to determine a time limit for which the latch is in the second state, the latch controller to set the latch in the first state based on the time limit.

8. The system of claim 7, wherein the relay switch is to output the second pressure signal for a duration of time corresponding to the time limit.

9. The system of claim 1, further including a calculator to:
calculate a parameter of the aircraft based on the first pressure signal when the latch is in the first state; and
calculate the parameter of the aircraft based on the second pressure signal when the latch is in the second state, the parameter including one or more of airspeed, dynamic pressure, or a mach number.

10. The system of claim 1, further including a common mode monitor to determine an operational mode of a flight control system of the aircraft based on the latch being in the first state or the second state.

11. A method comprising:
causing a relay switch to output a first pressure signal, the first pressure signal indicative of a pressure measured at one or more pitot tubes of an aircraft;
detecting a common mode pneumatic event at the pitot tubes of the aircraft based on the pressure measured at the one or more pitot tubes; and
causing the relay switch from outputting the first pressure signal to outputting a second pressure signal in response to the detection of the common mode pneumatic event, the second pressure signal indicative of an estimated pressure, the second pressure signal to be used to determine one or more airspeed parameters of the aircraft.

12. The method of claim 11, further including causing the relay switch to switch from outputting the second pressure signal to outputting the first pressure signal after a predefined period of time.

13. The method of claim 11, further including:
determining a pressure difference between the first pressure signal to the second pressure signal;
performing a comparison of the pressure difference to a threshold; and
causing the relay switch to switch from outputting the second pressure signal to outputting the first pressure signal based on the comparison.

14. The method of claim 11, further including causing at least one processor to validate the second pressure signal based on reference estimated pressure data.

15. A system comprising:
an air data reference function controller to generate a pitot tube pressure signal based on pressure signals output by pitot tubes of an aircraft, the air data reference function controller including a relay;
a synthetic signal pressure signal generator to generate an estimated pressure signal;
a calculator; and
a common mode pneumatic event detector in communication with the relay, the common mode pneumatic event detector to:

generate a first instruction to cause the air data reference function controller to output the pitot tube pressure signal to the calculator;

detect a common mode pneumatic event at the pitot tubes; and generate a second instruction to cause the air data reference function controller to output the estimated pressure signal to the calculator in response to the detection of the common mode pneumatic event, the estimated pressure signal to replace pitot tube pressure signal, the calculator to determine an airspeed of the aircraft based on the one of (a) the pitot tube pressure signal or (b) the estimated pressure signal.

16. The system of claim 15, wherein the common mode pneumatic event detector is to generate a third instruction to cause the air data reference function controller to output the pitot tube pressure signal to the calculator, the pitot tube pressure signal to replace the estimated pressure signal.

17. The system of claim 16, wherein the common mode pneumatic event detector is to detect an expiration of a time limit for which the air data reference function controller is to output the estimated pressure signal, the common mode pneumatic event detector to generate the third instruction in response to the expiration of the time limit.

18. The system of claim 15, wherein the common mode pneumatic event detector includes a latch, the first instruction based on a first signal generated by the latch when the latch is in a first state and the second instruction based on a second signal generated by the latch when the latch is in a second state.

19. The system of claim 18, wherein the common mode pneumatic event detector is to change a state of the latch from the first state to the second state in response to the detection of the common mode pneumatic event.

20. The system of claim 15, wherein the common mode pneumatic event detector is to:

generate a third instruction to cause the air data reference function controller to output the pitot tube pressure signal to the calculator, the pitot tube pressure signal to replace the estimated pressure signal;

determine that a difference between the estimated pressure signal and the pitot tube pressure signal exceeds a threshold; and maintain the third instruction to cause the air data reference function controller to output the pitot tube pressure signal in response to the difference exceeding the threshold.

* * * * *